United States Patent [19]

Duncan

[11] 4,232,775
[45] Nov. 11, 1980

[54] STRUCTURAL AND OPERATIONAL IMPROVEMENTS FOR A TWO ROW HARVESTER AND PILER

[76] Inventor: Richard A. Duncan, 123 Len Ct., Thibodaux, La. 70301

[21] Appl. No.: 945,157

[22] Filed: Sep. 22, 1978

[51] Int. Cl.³ .......................................... A01D 45/10
[52] U.S. Cl. .................................. 198/304; 56/14.3; 56/192; 180/242; 180/900; 198/313; 198/370; 198/508; 414/434
[58] Field of Search ............... 414/434; 56/14.3, 14.5, 56/192, DIG. 2; 198/313, 314, 367, 370, 304, 508; 180/242, 900

[56] References Cited

U.S. PATENT DOCUMENTS

| 2,427,313 | 9/1947 | Thomson | 56/192 X |
|---|---|---|---|
| 2,669,829 | 2/1954 | Pugh | 56/14.5 X |
| 3,236,324 | 2/1966 | Levratto | 180/242 X |
| 3,481,121 | 12/1969 | Broussard | 56/14.3 |
| 3,538,998 | 11/1970 | Willett | 56/14.3 X |
| 3,861,535 | 1/1975 | Huxley et al. | 180/242 X |
| 4,165,596 | 8/1979 | Duncan | 56/14.3 |

*Primary Examiner*—L. J. Paperner
*Attorney, Agent, or Firm*—James B. Lake, Jr.

[57] ABSTRACT

In a self-propelled, hydraulic four wheel drive two row cane harvester having a four-row piler with a main power source driving variable volume pumps for propulsion and operation; structural and operational improvements of a shortened wheel base, outward extension of right rear center carrier, individual suspension of rear wheels for stability on uneven ground, steerable rear wheels differentially linked by means of bell crank linkages, single articulation pilers having multiple row piling capacity, adjustable cane butt deflectors, and a combination range and speed controls with independent adjustments of ranges ground chain speeds and unit control of the cut cane carrier chains of all speeds within the set range.

6 Claims, 10 Drawing Figures

STRUCTURAL AND OPERATIONAL IMPROVEMENTS FOR A TWO ROW HARVESTER AND PILER

CROSS-REFERENCE TO RELATED APPLICATION

This is an improvement application for patent over my pending patent application, Ser. No. 827,524 filed Aug. 25, 1977, for "Apparatus And Method For Simultaneously, Cutting Two Rows Of Cane and Piling Four Tows Of Cut Cane On Two Rows".

BACKGROUND OF THE INVENTION

The invention relates generally to cane harvesters and pilers, and more particularly to a self-propelled, two-row cane harvester with a four row piler as described in my U.S. patent application Ser. No. 827,524 filed Aug. 25, 1977, and incorporated by reference herein.

The prior art comprises the following U.S. patents:

(a) B. C. Thomson, No. 3,002,330, which teaches a single row cane harvester, having a swiveling front wheel, mounted on the front of a crawler type tractor, and having a single articulation piler for piling cut cane in alignment with the rows and clear of the tractor tracks;

(b) H. J. Chauffe, No. 3,448,564, which teaches a single row, tricycle cane harvester, having a steerable front wheel and a double articulation piler in which the articulations are for moving the piler from working to traveling positions, and that piles in single longitudinal rows only;

(c) V. P. Broussard, No. 3,481,121, which teaches a tricycle cane harvester, having a steerable rear wheel smaller than the fixed front wheels, and a double articulation piler arranged in a force parallelogram to position automatically cut cane transverse the rows and pile six rows of cut cane across one row, and (d) John D. Segredo, No. 3,654,752, which teaches a multiple row forage harvester having no piler and for use with a trailer.

The invention, while disclosing some part of the advantages of the prior art, such as the single articulation of the piler and the rear track steering of Thomson, the multiple row piling and the single rear wheel steering of Broussard, and the multiple row harvester of Segredo, includes advantages unknown to the prior art and unobvious new combinations with, and of, the prior art, such as multiple transverse row piling with single articulation pilers, differentially steerable rear wheels for continuous stable suspension on uneven ground of in a four-wheel harvester, and a unitary speed control for simultaneous controlling chains and ground speeds, said speeds being independently settable in relative speed ranges.

SUMMARY OF THE INVENTION

It is an object of the invention to provide a two-row havester and piler with rear-wheels differential linkage, power-steering, and a shortened wheelbase for turning sharply.

Another object of the invention is to provide a two-row harvester and piler with the equivalent of three-point suspension in a four-wheel support and drive for stability on uneven ground.

Another object of the invention is to provide a two-row harvester and piler having a unitary speed control of right and left cut cane moving chains, and the ground speed the harvester with independent speed ranges of each being hydraulically settable.

Another object of the invention is to provide a two-row harvester and piler with single articulation pilers having adjustable rub bar gates for multiple row transverse piling in a continuous windrow.

Another object of the invention is to provide a two-row harvester and piler having an outward extension of a right bear carrier for providing additional fall space for center piled cane.

And the final object of the invention is to provide a two-row harvester and piler having adjustable cane-butt deflectors for controlling the fall of the cut cane in center piling.

DETAILED DESCRIPTION

Figure 1:
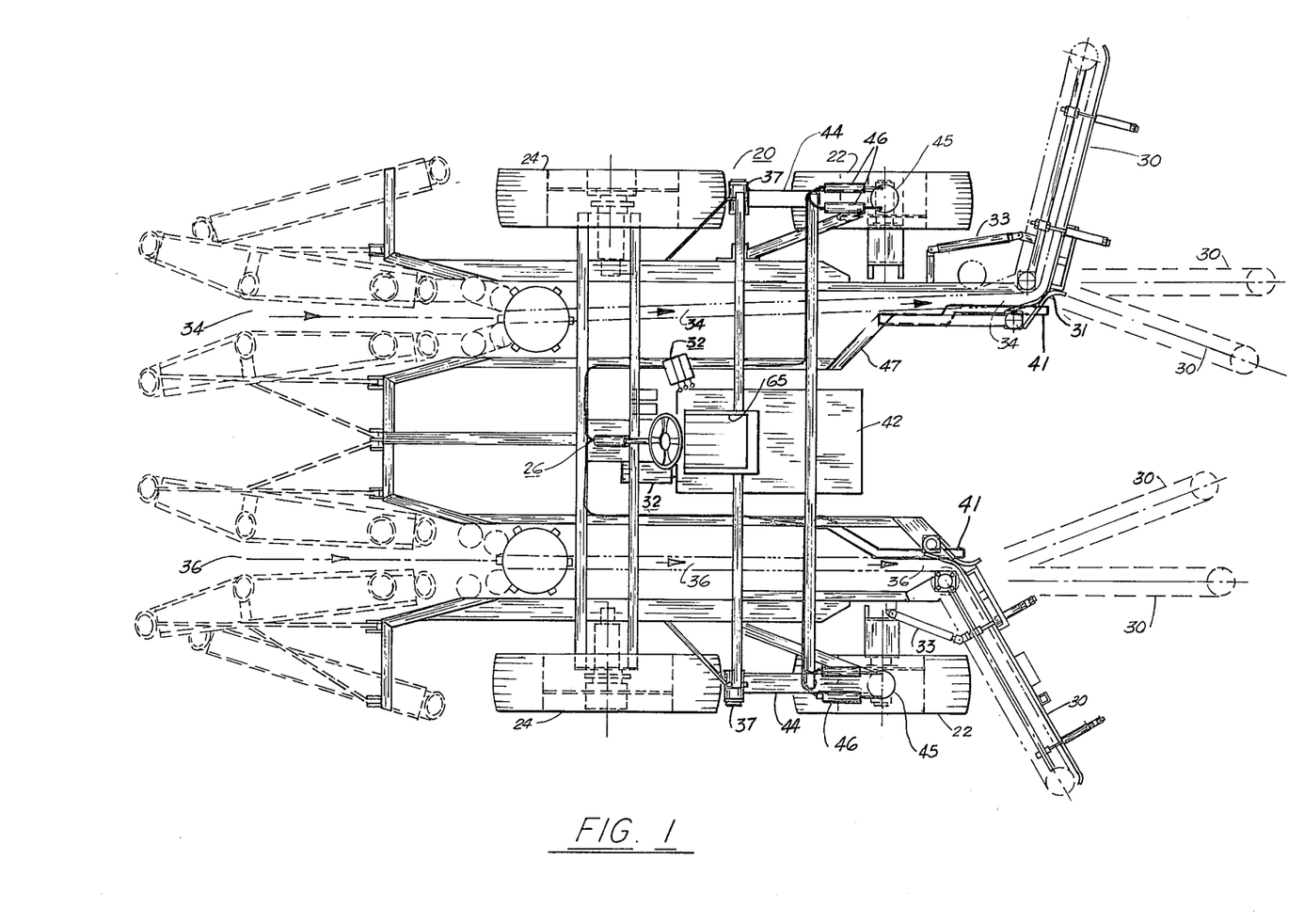
FIG. 1 is a plan view of the invention improvements in full lines.
Figure 2:
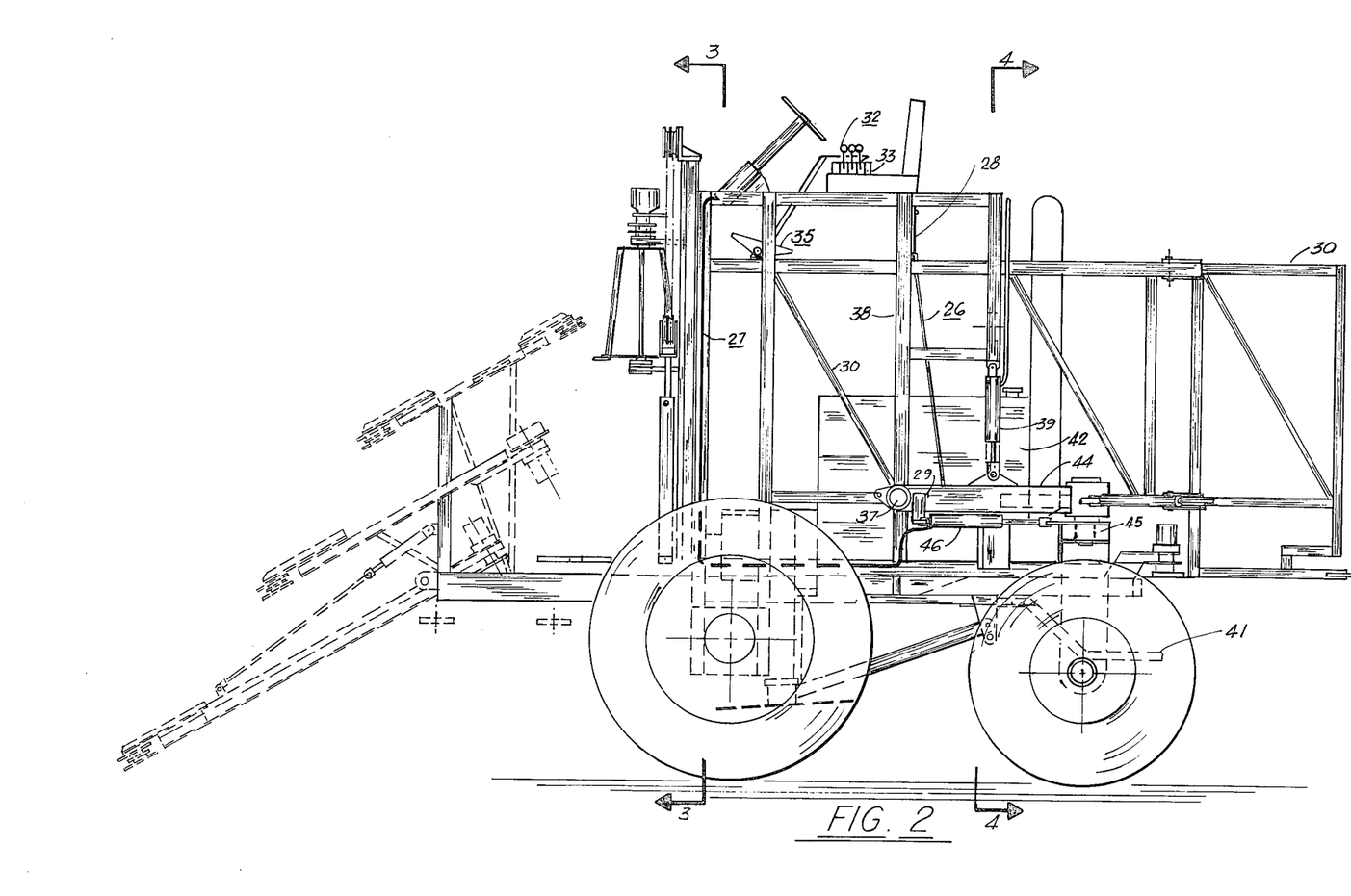
FIG. 2 is a side view of the apparatus shown in FIG. 1.
Figure 3:
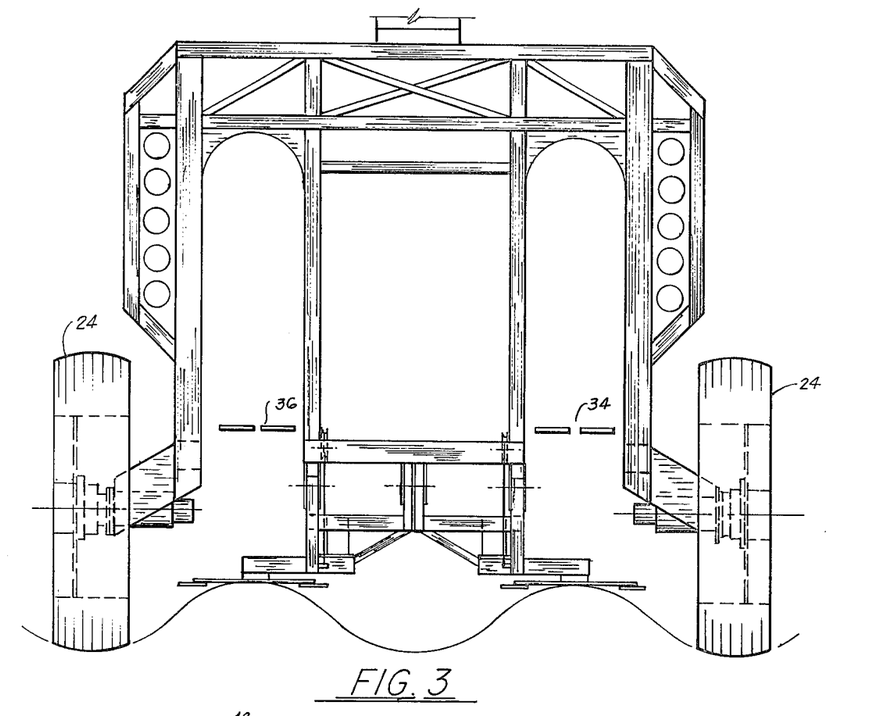
FIG. 3 is a cross-sectional view taken along section lines 3—3 of FIG. 2.
Figure 4:
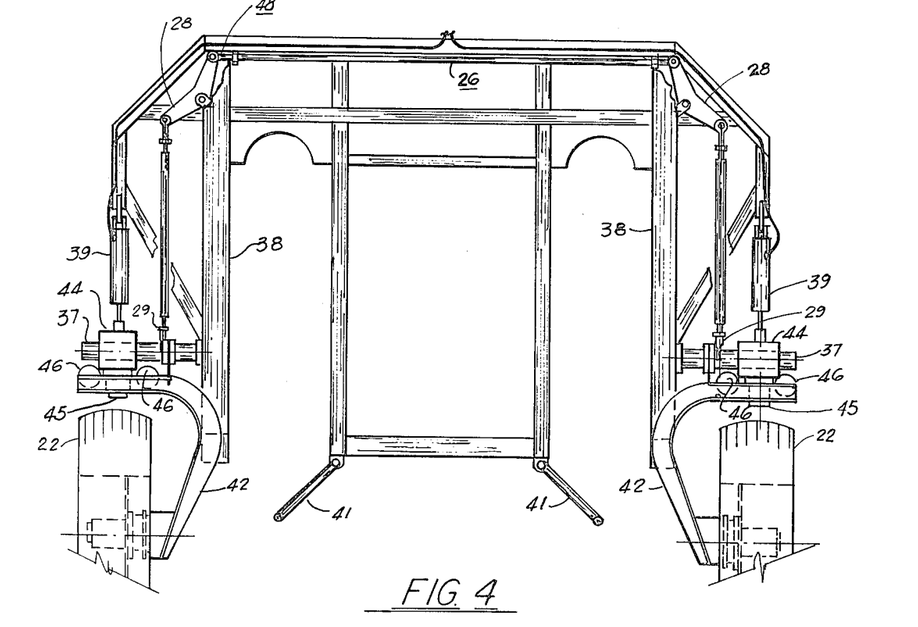
FIG. 4 is a cross-sectional view taken along section lines 4—4 of FIG. 2.
Figure 5:
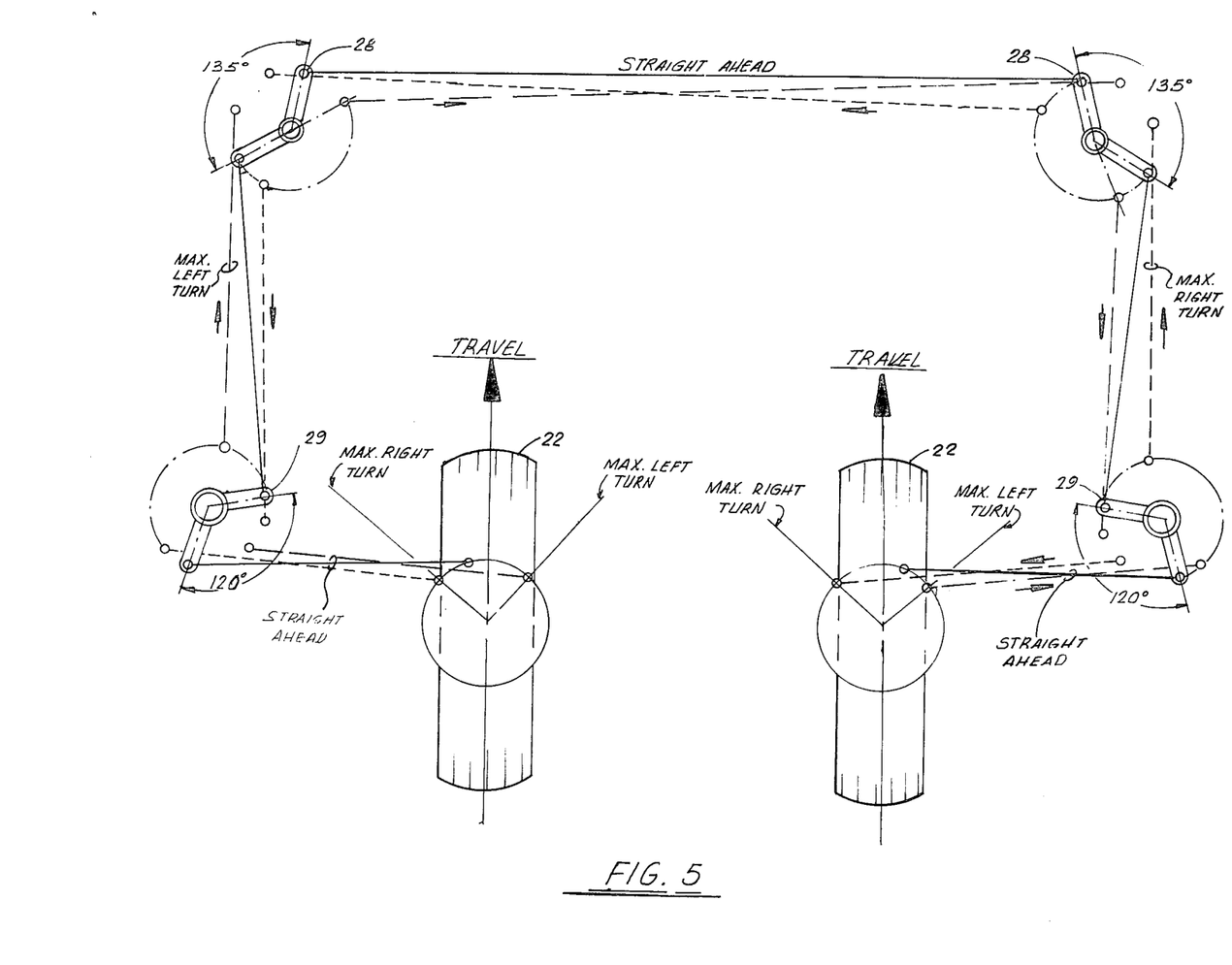
FIG. 5 is a diagrammatic sketch of a differential linkage of the steerable rear wheels with lower bellcranks rotated 90 degrees for clarity.

Referring generally to FIGS. 1–5, the invention comprises improvements to a two-row harvester and multiple row piler. A shortened wheel base harvester 20 is combined with steerable rear wheels 22 smaller than non-steerable front wheels 24 for making sharper turns at restricted ends of cane rows. A connecting apparatus 26 of rigidly connected pivotally mounted bellcranks 28 and 29 are arranged as shown in FIG. 5 and tie steerable rear wheels 22 together for differential pivoting in directional turns powered by hydraulic steering apparatus 27. A pair of single articulation pilers 30 as shown in FIGS. 1 and 2 are pivotally mounted at the rear of harvester 20 to swing to and from positions indicated in FIG. 1 with rub bar gates 31 longitudinally adjustable in discharge positions. A speed control apparatus 32 is a combination of hydraulic controls 33 that are independently set with ranges of the ground speed of the harvester and of cut cane moving chains 34 and 36, and mechanical controls 35 that unitarily control the speeds within the ranges. An equivalent of a three-point suspension for a four-wheeled harvester 20 is obtained by independently pivoting each of two rear wheel on respective horizontal pivots 37 fixed to frame members 38 and supporting the individual wheels loads with respective hydraulic cylinders 39. And adjustable cane-butt deflectors 41 are pivotally mounted forwardly of pilers 30 and respectively pivot transversely outward, and, in cooperation with an outward offset of the right carrier frame member 47 control the fall and fall space of cut cane. Cut cane butt deflectors 41, for use in center piling, are pivotally adjustable as best shown in the end and side views of FIGS. 4 and 2 respectively. A free end of each deflectors 41 extends below and across the associated rub for gate 52 as defined by pilers 30 in center piling position and as best shown in the plan views of FIGS. 1 and 7. The butts of the cut cane strike the butt deflectors, as the cut cane is carried through rubber gates 52 by cane carrying chains 34 and 36, to fall transversely inward in a center space defined between pilers 30 and by the outward offset, both transversely and longitudinally of right frame member 47 to which right piler 30 is pivoted for swinging.

The closely coupled front 24 and rear 22 wheels of harvester 20 are individually driven by hydraulic motors mounted on each wheel as in my prior harvester, the motors receiving high pressure fluid from a variable volume pump 40 driven by a main power source internal combustion engine 42. The wheel motors are connected in parallel with hydraulic pump 40 and drive the wheels 22 and 24 at differently speeds in turns. Variable volume hydraulic pumps 43 and 44 respectively drive right and left cane carrying chains 34 and 36.

Referring specifically to FIGS. 1, 2, and 4, rear wheels 22 are separately mounted for rotation on arbors 42 that are vertically pivoted for steering on pivots 45 to the rear on beams 44 which are horizontally pivoted at the respective forward ends to the horizontal pivots 37 for independent rear wheel suspension. Hydraulic cylinders 46 are mounted on beams 44 and operationally connect to the steering wheel as shown in FIGS. 2 and 4 to steerably pivot the arbors and rear wheels around vertical pivots 45. Hydraulically cylinders 39 (FIGS. 2 and 4) respectively bias rear wheels 22 downward around horizontal pivots 37 for maintaining ground contact with all four wheels in uneven fields.

Referring specifically to FIGS. 4 and 5, rear wheels 22 are rigidly tied together for differential turning directionally, that is the wheels are pivoted in unequal arcs dependent on the respective radii of the turns of the inside and outside wheels with reference to the direction of turn. A pair of bellcranks 28 defining arcs of 135 degrees between cranks, and a second pair of bellcranks 29 and defining 120 degrees between cranks are mounted as shown in FIG. 4, and positioned relative to each other as shown in FIG. 5. Thus a maximum turn to the right entails turning the right rear wheel to the left a longer arc than the left rear wheel is turned, and vice versa for left turns. The differential speeds of the respective wheels has already been provided for.

Figure 6:
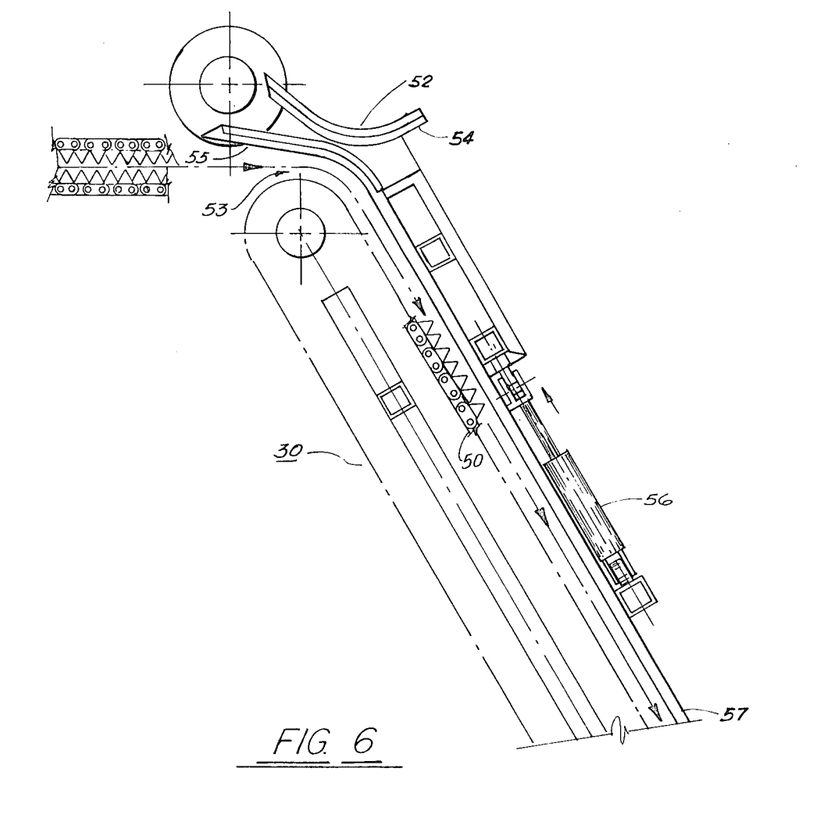
FIG. 6 is a plan view of left piler in position for outside piling.
Figure 7:
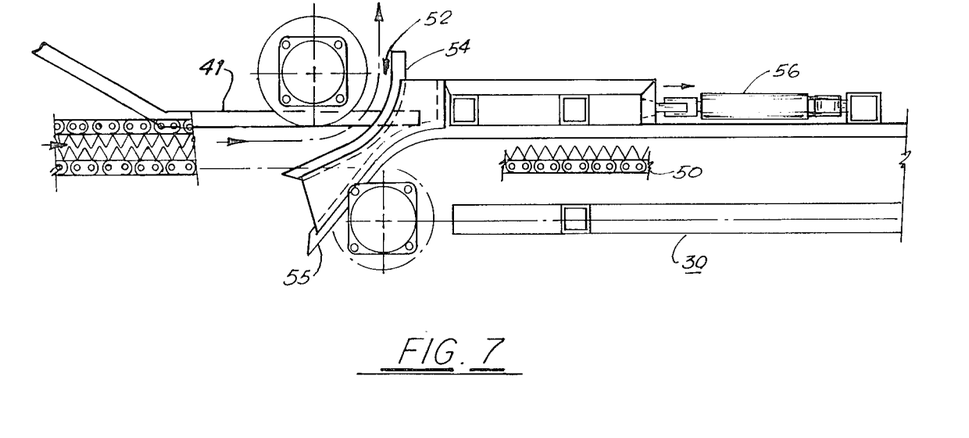
FIG. 7 is similar to FIG. 6 showing position of left piler for piling.

Referring specifically to FIGS. 1, 6 and 7, single articulation pilers 30 are shown in FIG. 1 for piling to the outside in full lines, to the inside when in aligned position with the harvester, and in travelling inoperative position when angled inward. Since both pilers operate similarly on their respective sides, only one piler, the left is illustrated and will be described. In FIG. 6 the left piler is in the outside piling position and comprises single cane moving chain 50 aligned with rub bar gate 53 defined by rub bar 55 and chain 50 of the piler at its pivoted end. The rub bar 55 is integral with a rub bar 54 and both are slidably mounted on the pivoted end of the piler to be extended and retracted by hydraulic cylinder 56 also mounted on the piler, when the plier is pivoted to an operating position, that is extended for outside piling and retracted for inside piling. As shown in FIG. 7 rub bar 54 defines the rub bar gate 52 for inside piling. Rub bar 55 is extended by a second rub bar 57 integral with the piler.

Figure 8:
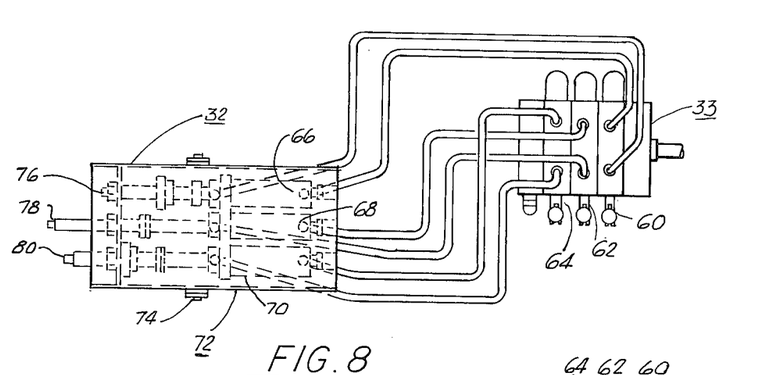
FIG. 8 is a plan view of speed control pedal showing hydraulic controls for setting individual speed ranges of cut cane moving chains and of the harvester over the ground.
Figure 9:
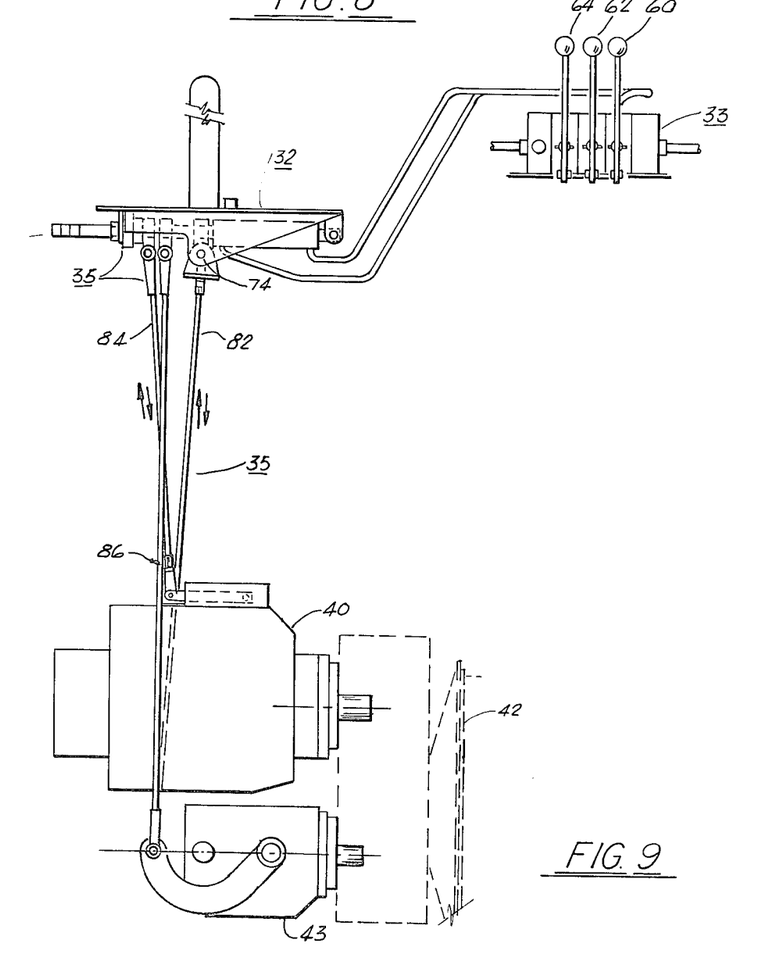
FIG. 9 is a side elevation of the apparatus of FIG. 8 and mechanical connections to variable volume hydraulic pumps for controlling the speeds of said chains and harvester.
Figure 10:
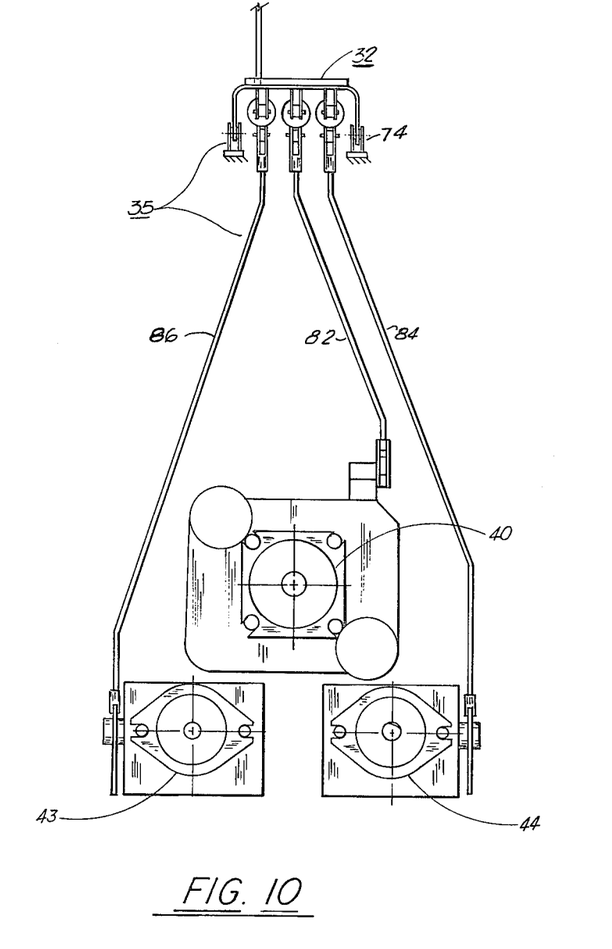
FIG. 10 is an end view of the mechanical connections of FIG. 9.

Referring to FIGS. 8–10, the combination speed control apparatus 32 comprises speed range setting hydraulic controls 33 and mechanical speed controls 35. Range setting controls 33 comprise three hydraulic valves 60, 62, and 64 mounted adjacent an operator's control position 65 for respectively acutating hydraulic cylinders 66, 68, and 70 parallelly mounted under speed control pedal 72 and under an end. Pedal 72 is pivoted by a center pivot 74 adjacent the control position 65, and cylinders 66–70 extends rods 76–80 slidably mounted therein variable distances across the center pivot, the vertical throw of the rods ends varying as the distance from the center pivot 74 of the pedal 72. Control levers are fixed to the rod ends, the other ends of said levers being connected respectively to the control valves of the variable volume hydraulic pumps 40, 43 and 44 for controlling them and the speed of the harvester over the ground and the speed of the harvester over the ground and the speed of the right and left cane carrying chains. Thus a relative range of speeds can be set up hydraulically, and the speeds within the range unitarily controlled by the pedal.

What is claimed is:

1. In a four-wheel harvester and pilers, having a right rear carrier frame member, sequential pairs of cane-moving chains, and a power train with hydraulic means for driving said chains and wheels and pilers,
   (a) individual suspension means for independently mounting rear wheels on said harvester and pilers to provide harvester and pilers mobile stability on uneven ground
   (b) individual speed range setting means and unitary mechanical speed control means respectively connected to said hydraulic means for driving said chains and wheels for individually setting speed ranges and controlling the speed within any of said ranges of said chains and wheels,
   (c) single articulation piler means mounted behind and above said four wheels on said harvester and pilers and operably connected to said hydraulic means, and having longitudinally adjustable rub bar gate means fixed thereto for cooperating in side piling two rows of cut cane and center piling two rows,
   (d) cane butt deflector means mounted on said harvester and pilers and pivotally adjustable to extend below and across said adjustable rub bar gate means for cooperating with said piler means in center piling two rows, and
   (e) outward extension means fixed to said carrier frame member just forward of right rear wheel for providing additional fall space for center piled cane.

2. In a harvester and improvements as described in claim 1 wherein said individual suspension means each comprise:
   (a) a horizontal beam, having oppositely disposed front and rear ends and a center, pivoted by said front end to the harvester for the rear end to swing up and down and to which a rear wheel is steerably attached; and (b) an hydraulic cylinder mounted above and engaging said beam between said ends for supporting the load on said wheel.

3. In a harvester and improvements as described in claim 1 wherein said unitary mechanical speed control means comprises:
   (a) a pedal, having oppositely disposed front and rear ends, center pivoted transversely between said ends to said harvester;
   (b) rod control means extending from cane moving chains and harvester hydraulic drive means upward for attaching to said pedal between center pivot and said front end.

4. In a harvester and improvements as described in claim 1 wherein said individual speed range setting means comprises:
   (a) hand operable hydraulic valves for right and left cane moving chains and the harvester connected to hydraulic power and mounted in the harvester therabove;
   (b) hydraulic cylinders mounted parallely in a row on said speed range setting means and connected to said hand operable valves respectively for individual actuation thereby to extend and retract their respective rod ends in fore and aft directions;
   (c) adjustable connections on said respective rode ends for engaging respective hydraulic power control rods.

5. In a harvester and improvements as described in claim 1 wherein said pilers and rub bar gate means comprise:
   (a) integral rub bars oppositely disposed for defining sequentially a pair of rub bar gates, said rub bars being slidably mounted on the articulated end of said piler; and
   (b) an hydraulic cylinder mounted on said piler and operable to slide said integral rub bar in rod end retraction when piler is in a harvester aligned position to define a rub bar gate for center piling, and in extension when piler is in outwardly transverse position to define a rub bar gate for outside piling.

6. In a harvester and improvements as described in claim 1 wherein said outward extension means comprises; a frame element fixed to a right rear center carrier frame member to extend diagonally outward and rearward for enlarging space between piler means and displacing right piler means rearward from left means thereby preventing center piled cane from one row from interfering with the fall of falling cane from the other row.

* * * * *